US005427640A

United States Patent [19]

Daniels

[11] Patent Number: 5,427,640

[45] Date of Patent: Jun. 27, 1995

[54] LIBRARY ITEM POCKET AND IDENTIFICATION SYSTEM

[75] Inventor: Sean J. Daniels, Burleson, Tex.

[73] Assignee: Holden Business Forms Company, Minneapolis, Minn.

[21] Appl. No.: 898,023

[22] Filed: Jun. 12, 1992

[51] Int. Cl.[6] .......... B32B 31/00

[52] U.S. Cl. .......... 156/250; 156/268; 156/248; 156/292; 428/40; 428/41; 206/232; 206/45; 40/310; 40/638; 40/159; 40/360

[58] Field of Search .......... 428/40, 41; 206/232, 206/45; 156/268, 248, 292, 250; 40/310, 638, 159, 360

[56] References Cited

U.S. PATENT DOCUMENTS 3,993,814 11/1976 Cavender .......... 40/638
4,110,502 8/1978 Baer .......... 428/40
4,568,403 2/1986 Bgan .......... 156/247
4,927,179 5/1990 Ehret .......... 283/79
5,147,699 9/1992 Browning .......... 428/40
5,195,123 3/1993 Clement .......... 378/166

*Primary Examiner*—W. Gary Jones
*Assistant Examiner*—Mark De Simone
*Attorney, Agent, or Firm*—Merchant, Gould, Smith, Edell, Welter & Schmidt

[57] ABSTRACT

A borrower's card holder, such as a library card, is formed from a sheet of liner material with individual sheets of card holder material having printable front surfaces adhered to the liner material. Through cuts are formed through the sheets of card holder material to form individual holders. Partial cuts are formed through the liner material to define pockets.

18 Claims, 7 Drawing Sheets

FIG. 5
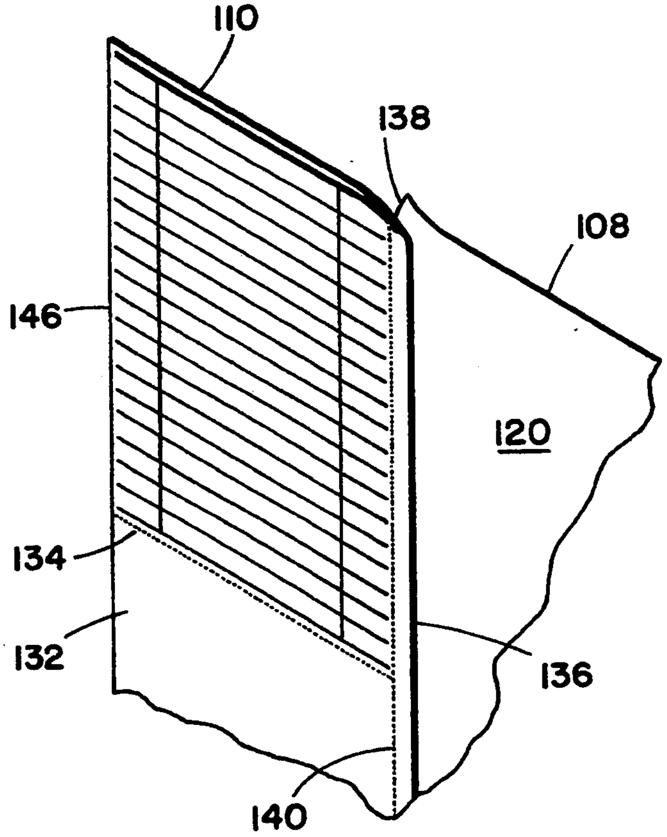
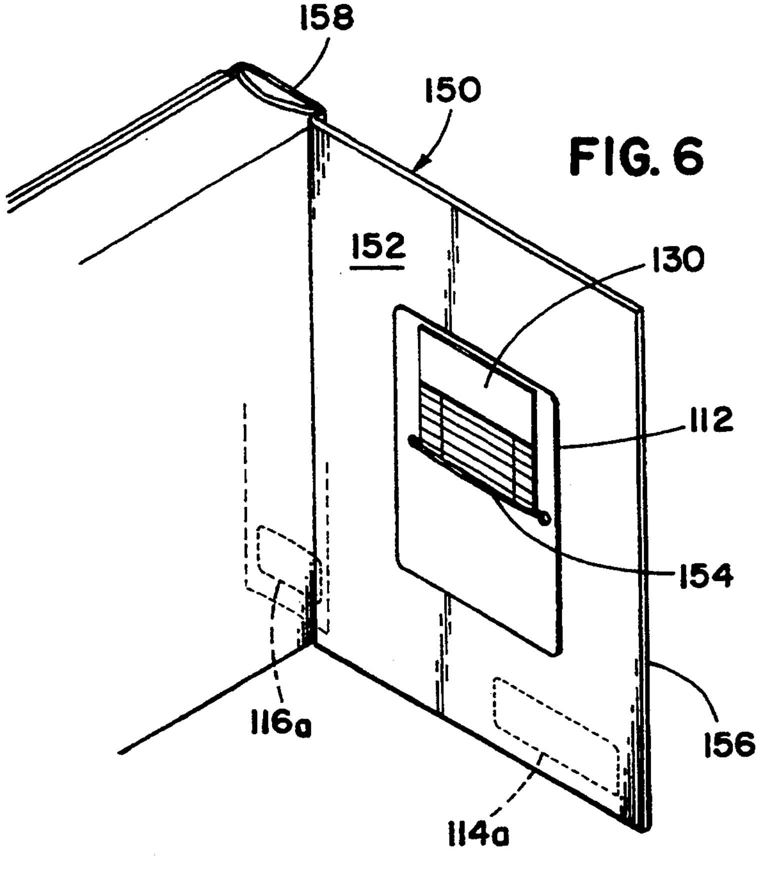
FIG. 6

LIBRARY ITEM POCKET AND IDENTIFICATION SYSTEM

FIELD OF THE INVENTION

This invention relates generally to a pocket forming device for library items and a system of providing identification labels and cards for attachment to the items. The present invention is specifically described as used in connection with a library book, but the principals involved are applicable to other library items and also extend to other businesses where items are inventoried and loaned out. Such other businesses might include hospitals that track medical records that are checked out by doctors or other personnel.

BACKGROUND OF THE INVENTION

When libraries purchase new books, the books must be prepared before they can be loaned out. The purpose of preparing the books is so the library can track them both internally and when the books are loaned out to members of the public. Although it varies somewhat from library to library, most libraries prepare their books in the following manner.

A borrower's card pocket is placed in each book, often on the back or front inside cover. This pocket holds a borrower's card which is filled out with appropriate information and retained by the library when the book is loaned out.

The pocket itself often has a form printed thereon. The form is for keeping track of the date when the book is due back at the library. As a result, the user can keep track of the due date.

The card pocket is imprinted with identifying information about the specific book to which it is attached. Common information to include on the pocket is the name of the book, the Dewey decimal number, the name of the library or organization loaning the book, and another number uniquely identifying the book.

Labels are also placed on the spine of the library book identifying the Dewey decimal number of the book and sometimes additional information as well. Also, another identification label is applied to the back of the book or the inside cover of the book. This label is often printed with a bar code so that the label can be scanned with a bar code reader to automatically pull up the specific information about that book. This label can also include the name of the library or organization loaning the book, the name of the book, the Dewey decimal number of the book, and other information about the book.

Finally, a borrower's card is prepared which has a form on it for keeping track of the borrowing activity of the book, for instance, the name of the borrower and the date due. The borrower's card is also imprinted with identifying information about the book. Often this includes the name of the book, the Dewey decimal number of the book, and a number uniquely identifying the book.

The prior art method for preparing all of these identification components to be attached to the library book is a very labor intensive process. All of the different pockets, labels, and cards are printed with identifying information at separate times and sometimes at separate locations. One of the reasons for this batch method of preparing these identifying materials is that each of the components is part of a larger group of the same components and therefore the same component for several different library books are all printed at the same time. For instance, there may be a sheet of numerous spine labels, only two of which are needed for any particular book, but the whole sheet of spine labels are printed at the same time and correspond to numerous different books.

It is easy to see that this type of batch processing leads to several disadvantages. Perhaps the biggest disadvantage is the amount of labor that is necessary to collate all of the identifying components for any one book. The card pocket, the spine labels, the identification labels, and the borrower's card, which have all be prepared separately, must be matched up. Then, these materials must be kept together in some fashion until they rendezvous with the appropriate book at which time they are attached to the book. This multiplicity of operations and steps not only results in high labor time, it also results in errors in terms of the wrong items being matched together. It also results in more opportunities for the individual identifying components to become lost or separated from the rest of the components for that book.

With respect to the borrower's card pocket, prior art designs of pockets presents several drawbacks. One of the most common card pocket designs is made by attaching two pieces of paper material together by gluing together the outer portions of the side and bottom edges of the two pieces of paper. The top piece of paper has a square window cut out of it and the bottom piece of paper usually has some sort of form printed thereon for keeping track of the due date of the library book. The borrower's card can then be placed in the pocket formed by this particular construction of the two pieces of paper. The back of this pocket usually has an adhesive applied to it which is releasably covered by a liner until such time that the card is attached to the book.

As mentioned, this design has several drawbacks. Just as other businesses are doing, libraries and companies preparing library books are switching from using impact printers to laser printers. The switch to laser printers gives rise to the need for thinner identifying materials as thicker materials or materials with uneven thicknesses can often jam laser printers. The prior art card pocket construction described above does not work well in many styles of laser printers. The glue and relatively heavy paper materials as well as the need for two pieces of paper and also a liner result in a pocket that is fairly thick and not uniform in thickness. This does not lend itself to laser printers. Furthermore, again because of the glued construction, these card pockets do not bend well and are likely to crack or break when they are bent. Furthermore, the drying of the glue causes the paper to curl somewhat. Finally, these pockets are constructed in such a way that they need to be hand trimmed and cut before they are ready to be applied to a library book.

Another prior art card pocket construction is shown in U.S. Pat. Nos. 3,424,636, and 3,592,381, each having the same inventor. U.S. Pat. No. 3,592,381 shows a pocket formed by a piece of paper material having adhesive on its rear surface in some areas and no adhesive in other areas. The rear surface of the paper is covered by a liner attached to the adhesive and when the liner is removed, a portion of the liner remains attached to the middle portion of the adhesive, forming the pocket when the paper is attached to the book. The design of this pocket is somewhat complex in that the paper not only has adhesive on its rear surface, it also has adhesive on a portion of its front surface which is then folded back to be attached to the book. Apparently, the purpose of this construction is to insure that the pocket can be pulled out from the book some distance when the card is inserted.

U.S. Pat. No. 3,424,636 shows a pocket of similar design with the same complex pattern of adhesive application to the rear of the pocket. More specifically, both patents show at least a couple stripes where no adhesive is applied. Both these patents show the same turned-under design requiring adhesive on the front of the paper as well as on the back. Furthermore, this patent shows the further complexity of spacer materials placed between the paper and the liner where the card is inserted into the pocket, again, presumably so that the pocket can be slightly pulled away from the book.

These prior art pockets are relatively complex and do not lend themselves to manufacturing products from easily available materials. More specifically, readily-available pressure sensitive label stock having adhesive on the back side of a piece of paper covered by a liner could not be used in these designs because of the need for the specifically placed zones of no adhesive and also because these designs require that there also be an adhesive strip applied to the front side of the paper.

The present invention solves the problems of the prior art, as well as other problems, by providing a card pocket which is easily manufactured from commercially available label stock and one that is adapted for printing by laser printers. Furthermore, the invention provides a system wherein all of the identifying components for any one library book are all printed with identifying information at the same time and are all located on the same page or sheet of material so all of the information is not only printed at the same time, but stays together until it is matched with the appropriate book and applied to that book.

SUMMARY OF THE INVENTION

The present invention provides a device for forming a card holder in an item available for temporary loan from a central location of items. The device has label material with a printable front surface and pressure sensitive adhesive applied to the back surface. The pressure sensitive adhesive is covered by releasable liner material. The label and liner are partially, horizontally cut to form the opening of the pocket for holding the borrower's card. The liner is cut along lines so that when the liner is released from the label, a portion of the liner remains to cover the adhesive, thus forming the front wall of the pocket.

The present invention also provides an integrated identification system for an item available for temporary loan from a central location of items. The system includes a sheet of label material with a printable front surface and an adhesive on its back surface. The adhesive is covered by a releasable liner. The label material and the liner materials are each separately cut in such a way as to form a holder for borrower's card as well as forming labels which can be printed with identifying information about a the item.

The present invention further provides an integrated identification system for an item available for temporary loan from a central location of items, including a borrower's card. The system includes a sheet of label material with a printable front surface and adhesive on its back surface. A releasable liner covers the adhesive. Both label and liner materials are separately cut to cooperatively form a card holder. A paper borrower's card is also releasably attached to one edge of the liner so that the card holder and borrower's card can be printed in one operation and remain together until attached to the item.

DESCRIPTION OF THE DRAWINGS

In the drawings, where like numerals refer to like elements throughout the several views:

FIG. 5 is a rear perspective view showing a portion of the system shown in FIG. 4.

FIG. 6 is a perspective view of a library book to which the components of the present invention shown in FIG. 4 have been attached.

Figure 4:
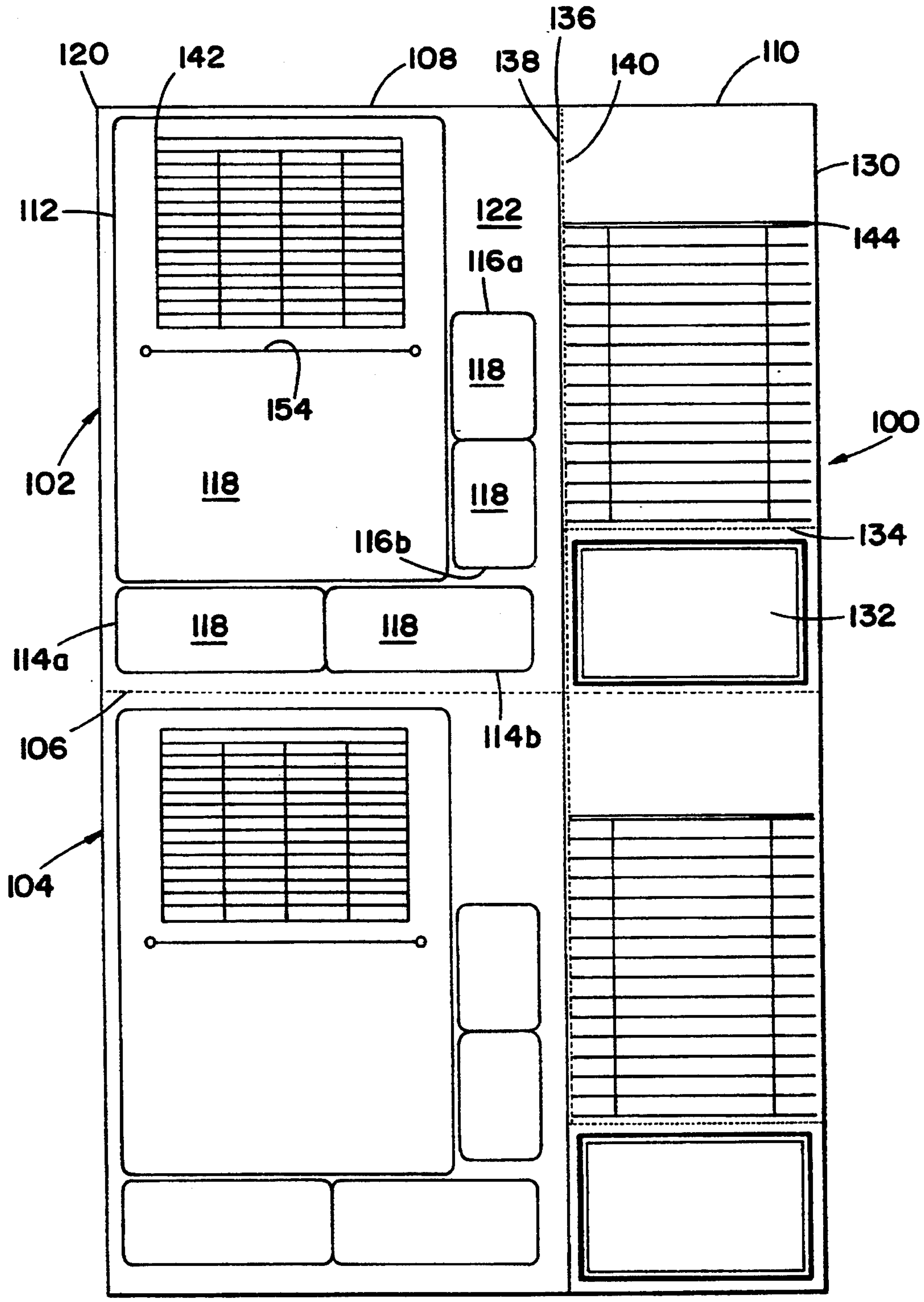
FIG. 4 is a front view of the library item identification system of the present invention.

FIGS. **8*a*–8*d* are perspective views of label portion 108 of the identification system of FIG. 4 illustrating the results of different steps in the process of preparing label portion 108**.

Figure 9:
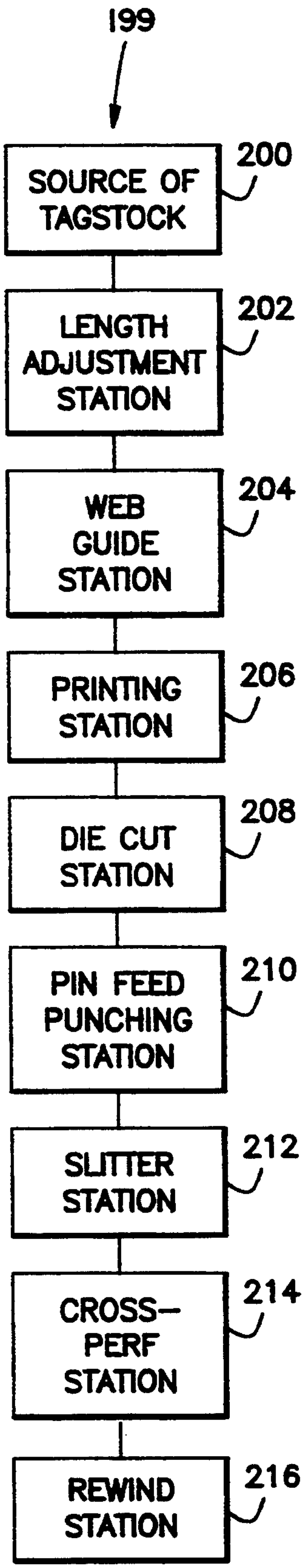

FIG. 9 is a block diagram illustrating the process of preparing card portion 110 of the library item identification system shown in FIG. 4.

Figure 10:
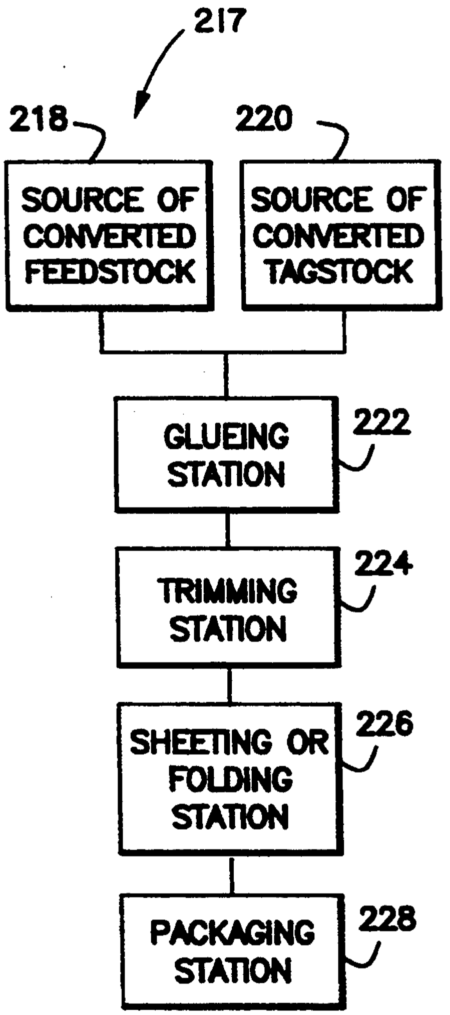

FIG. 10 is a block diagram illustrating the process of attaching label portion 108 and card portion 110 to form the library item identification system shown in FIG. 4.

Figure 11:
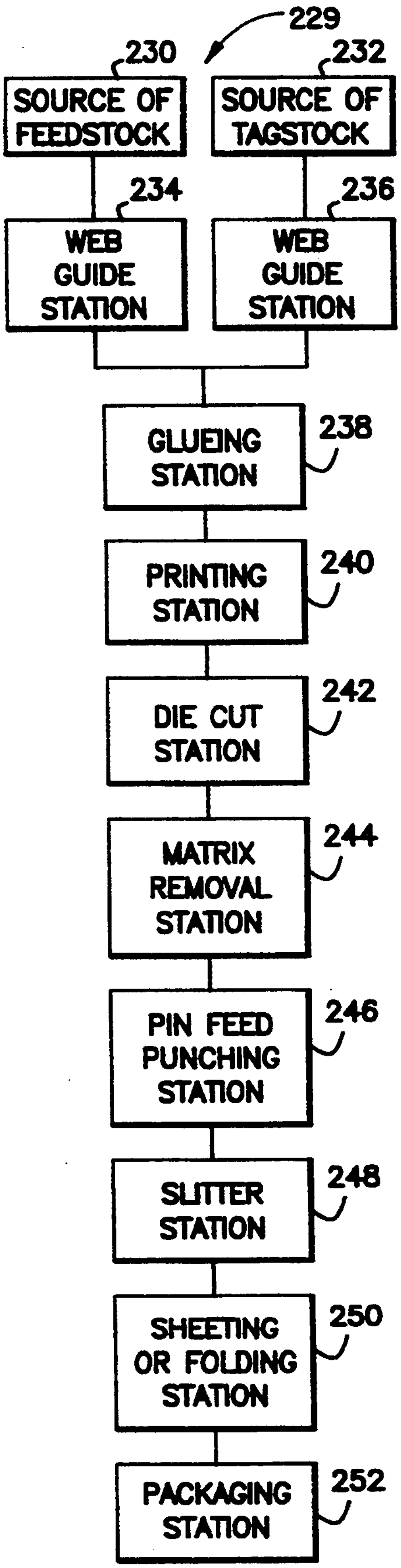

FIG. 11 is a block diagram illustrating the process for preparing and attaching in one operation, label portion 108 and card portion 110 of the library item identification system shown in FIG. 4.

DETAILED DESCRIPTION OF THE PREFERRED EMBODIMENT

In the following detailed description of the preferred embodiment, reference is made to the accompanying drawings which form a part hereof, and in which is shown by way of illustration specific embodiments in which the invention may be practiced. It is to be understood that other embodiments may be utilized and structural changes may be made without departing from the scope of the invention.

Figure 1:
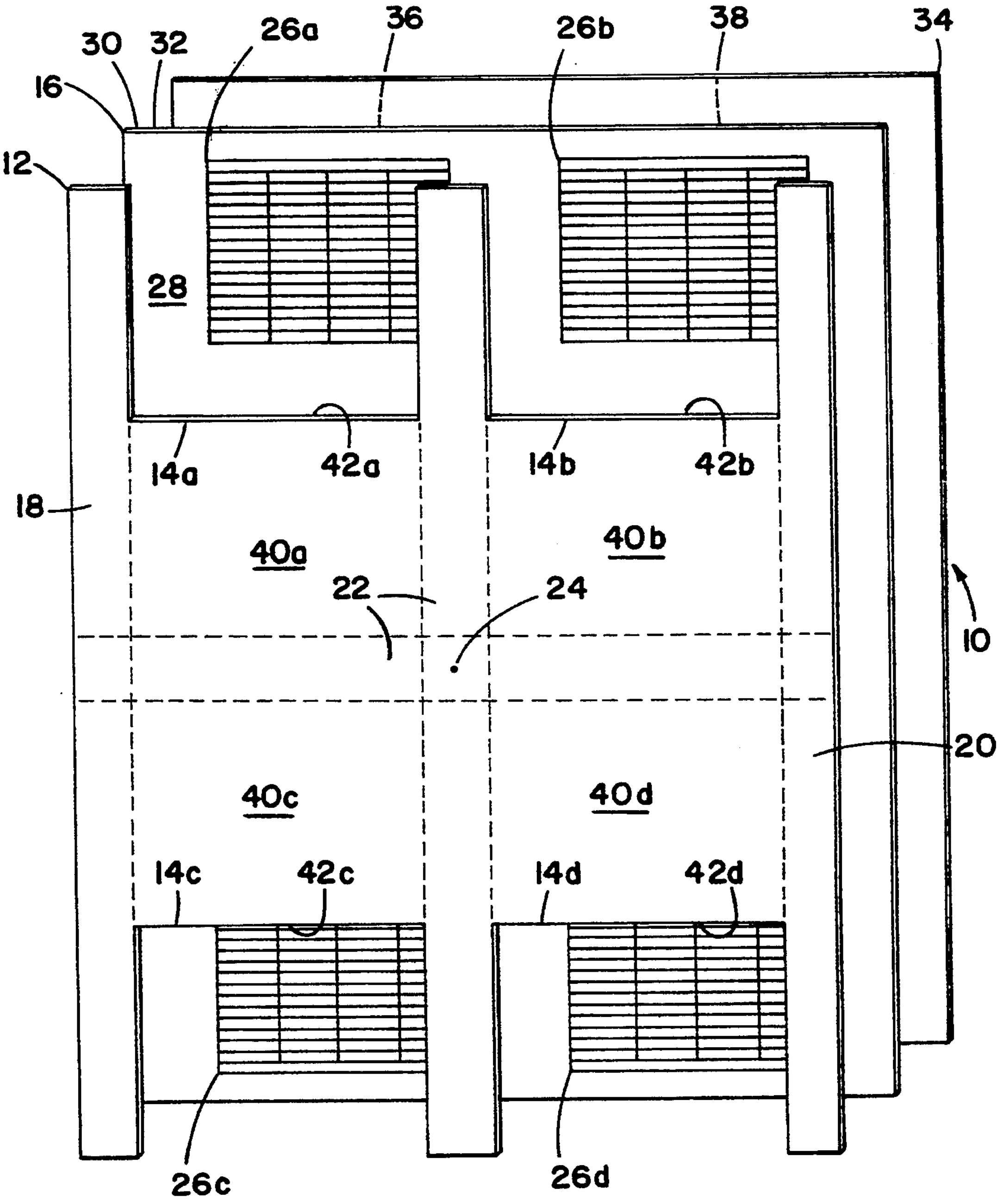
FIG. 1 PRIOR ART
FIG. 1 is an exploded view of the construction of a prior art card holder.

FIG. 1 shows a prior art card holder design. Holder assembly 10 is a four-up construction, meaning four pockets are constructed together and then later separated for attachment to four library books. Holder assembly 10 is comprised of a top layer of paper 12. Paper layer 12 is paper of the type commonly used for manila folders. Paper layer 12 has four windows cut out of it, referred to in FIG. 1 as **14*a–d*. Paper layer 12 is attached to backing paper layer 16 by gluing layers 12 and 16 together in areas 18 and 20 and in cross-pattern area 22, wherein the intersection of cross-pattern 22 is located at 24 on holder assembly 10. Backing paper layer 16 is printed with four identical forms 26*a–d* for recording due date information. Due date forms 26*a–d* are printed on the top side 28 of backing paper layer 16. Forms 26*a–d*** are located on backing paper layer 16 so that they coincide with window 14*a–d* in top paper layer 12 and are thus visible.

Bottom side 30 of backing paper layer 16 is coated with pressure sensitive adhesive 32 which is in turn covered by liner 34. Liner 34 has two vertical cuts 36 and 38 to facilitate its removal from holder assembly 10 at the appropriate time.

After construction, holder assembly 10 is separated into four pieces 40*a–d* by cutting down the middle of cross-pattern 22 both horizontally and vertically. If necessary, each pocket 40*a–d* can then be trimmed to the appropriate size. It can be seen that the construction of holder assembly 10 forms pockets 42*a–d* into which can be placed an appropriately sized borrower's card (not shown).

Figure 2:
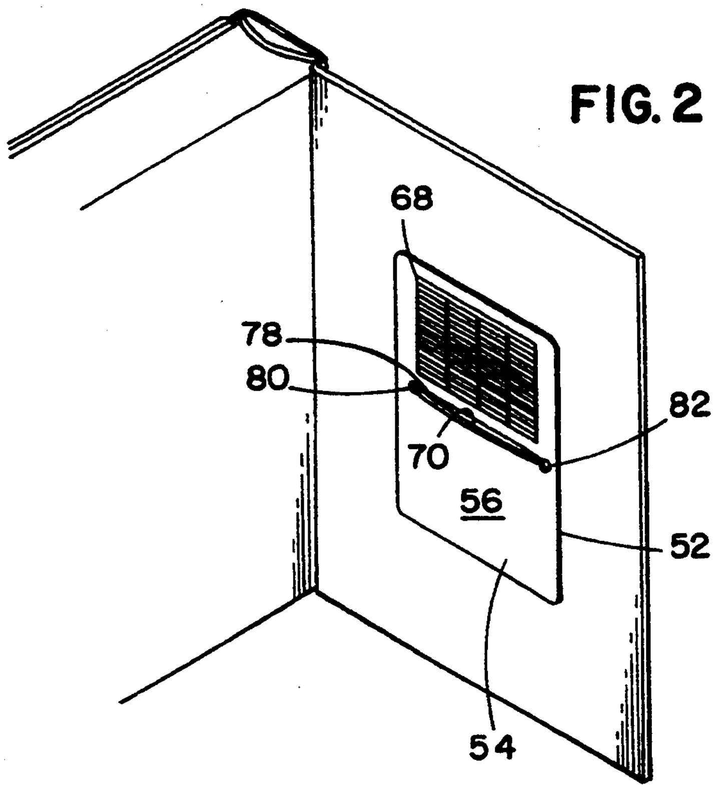
FIG. 2 is a perspective view of a library book provided with a card holder formed according to the present invention.
Figure 3:
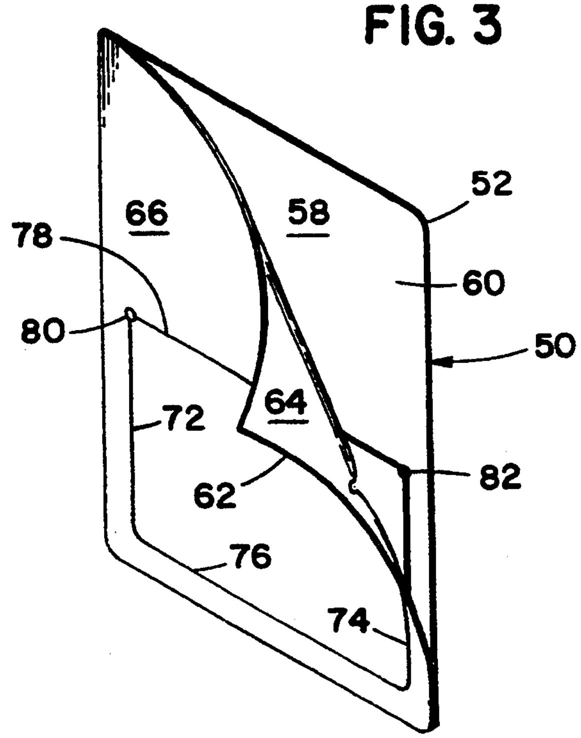
FIG. 3 is a rear view of the device for forming a card holder of the present invention with a portion of the device turned back.

FIGS. 2 and 3 shows the improved card holder of the present invention. Card holder assembly 50 is comprised of facestock or top layer 52. In FIG. 2, the holder assembly is shown attached to a library book. FIG. 3 shows the back side of holder assembly 50.

In the preferred embodiment, facestock 52 is a synthetic polyform material. This material is available from Central Products, part of Wausau Coatings. Again, in the preferred embodiment, facestock 52 is from Kimberly Clark and is coated with laser printable top coating 54. In the preferred embodiment, facestock 52 is also tinted with beige ink to provide the traditional manila color. This ink is designed to adhere to facestock 52 without inhibiting toner adhesion.

Synthetic facestock 52 is more advantageous than paper facestock because the synthetic facestock resists tearing when pulled on at a clean cut edge. Also, synthetic facestock 52 resists distortion from the heat of a laser printer. Coating 54 allows laser printer toners to easily adhere to facestock 52 when holder assembly 50 is fed through a laser printer for the printing of the identifying information on top side 56 of facestock 52.

Bottom side 58 of facestock 52 is coated with pressure sensitive adhesive 60. Adhesive 60 can be any permanent pressure sensitive adhesive, but in the preferred embodiment, it is a permanent acrylic pressure sensitive adhesive. Adhesive 60 is of the type that will bond directly to the paper substrate of a book and is designed to last the lifetime of the book.

Releasable liner 62 covers adhesive 60 on facestock 52. In the preferred embodiment, liner 62 is a magnum liner, also available from Central Products, which is a laminated embossed liner of white bleached kraft. Top side 64 of liner 62 is relatively smooth while back side 66 of liner 62 is textured. Liner 62 facilitates the feeding of pocket assembly 50 through a laser printer and also helps ensure that pocket assembly 50 lays flat during the laser printing process because textured back side 66 helps dissipate the heat from the printer. In the preferred embodiment, synthetic polyform facestock 52 is purchased with adhesive coating 60 and liner 62 already on it.

In the preferred embodiment, top side 56 of facestock 52 is printed with due date form 68. Form 68 can be used by the user of a library book to note the date that the library book is due back.

The actual pocket 70 in pocket assembly 50 is formed by a number of cuts, some in liner 62, and another through both facestock 52 and liner 62. More specifically, as can be seen in FIG. 3, liner 62 is cut along side lines 72 and 74 and along the bottom line 76. Cuts 72, 74, and 76 are only deep enough to go through liner 62 and therefore do not affect facestock 52. The top edge 78 of pocket 70 is formed by cutting through both liner 62 and facestock 52. As can be seen, top edge cut 78 does not extend all the way to the edges of pocket assembly 50, but it is wide enough so that a normal size borrower's card can be received in pocket 70. As can be seen in the preferred embodiment, cuts 72, 74, 76, and 78 define a rectangular region.

In the preferred embodiment, top edge cut 78 of pocket 70 is terminated in circle cuts 80 and 82 which are cut through both liner 62 and facestock 52. The below described advantages which flow from circle cuts 80 and 82 can also result if circle cuts 80 and 82 are only cut into facestock 52 and do not extend through to liner 62. Circle cuts 80 and 82 provide stress relief when pocket 70 is being manipulated to either remove or insert a borrower's card. More specifically, circle cuts 80 and 82 provide enough flexibility for top edge 78 of pocket 70 to be pulled out from the page or cover to which holder assembly 50 is eventually attached. Circle cuts 80 and 82 also play a very important roll in providing lateral stress relief for top edge cut 78 so that facestock 52 does not rip or tear when pocket 70 is used. Finally, circle cuts 80 and 82 also provide an easy reference point for users attempting to locate top edge 78 of pocket 70.

While the preferred embodiment has circle cuts 80 and 82, it is contemplated that with different types of facestock 52, circle cuts 80 and 82 may not be necessary for stress relief or other purposes.

In use, holder assembly 50 is applied to an appropriate location in a library book by releasing liner 62 from facestock 52. Because of cuts 72, 74, 76, and 78 in liner 62, the portion of liner 62 enclosed by these cuts remains attached to adhesive 60 on facestock 52 when the rest of liner 62 is removed. Thus, when facestock 52 is applied to the book, the whole bottom side 58 of facestock 52 adheres to the book except for the area between cuts 72, 74, 76 and 78. The portion of liner 62 which remains adhered in this area forms the front wall of pocket 70 with the book itself forming the rear wall.

FIG. 4 shows the design and construction of the identification system of the present invention. FIG. 4 shows identification assembly 100. Assembly 100 is comprised of identical upper and lower portions 102 and 104, respectively. Assembly 100 is a two-up design in the preferred embodiment and is approximately eight in a half inches by fourteen inches, which corresponds to common paper size, and thus makes assembly 100 easily fed through a desktop style laser printer. Assembly 100 can also be used in a normal typewriter or impact printer if special printing, such as bar codes, are not necessary. Perforation 106 is provided in assembly 100 so that upper portion 102 and lower portion 104 can be separated at the appropriate time.

Although the preferred embodiment is a two-up design as shown in FIG. 4, assembly 100 can alternatively be a continuous form with additional horizontal perforations at the top and bottom of assembly 100 so that the form can be folded. For continuous form use, assembly 100 would also be punched on the side edges with pin feed holes so that the form could be fed through a laser or other type printer.

The design and construction of upper portion 102 of assembly 100 will now be described. This description will suffice as a description of lower portion 104 as it is identical to upper portion 102. Upper portion 102 includes label portion 108 and card portion 110. Label portion 108 includes card holder assembly 112, identification labels 114*a–b* and spine labels 116*a–b*. All of components 112, 114, and 116 are comprised of label material 118 having a printable top surface and a bottom surface coated with pressure sensitive adhesive. Backing sheet or liner 120 covers the adhesive on the back of label material 118 on holder assembly 112, identification labels 114*a–b* and spine labels 116*a–b*. Empty region 122 on label portion 108 in which there is no label material shown in FIG. 4, can be used for additional or special labels, such as user identification labels.

Label material 118 and the corresponding attached portion of liner 120 are cooperatively cut to facilitate the forming of a pocket when card holder assembly 112 is released from liner 120. In the preferred embodiment, the construction of card holder assembly 112 is the same as that earlier described in connection with card holder assembly 50 shown in detail in FIGS. 2 and 3.

Card portion 110 of identification assembly 100 will now be described with reference to FIGS. 4 and 5. Card portion 110 is comprised of paper stock suitably durable for serving as a borrower's card. In the preferred embodiment, 125# white library tag is used in order to meet trade specifications for borrower's cards. This type of paper is sufficiently durable, yet can easily be fed through a laser printer without causing jams or other problems. Card portion 110 is comprised of upper portion 130 which serves as the borrower's card and lower portion 132 which is an extra card which can be used for a variety of purposes. For instance, portion 132 can be imprinted with advertising, instructions for using identification assembly 100, or portion 132 can function as a book mark. These or any number of other uses will be contemplated by those skilled in the art.

Perforation 134 is between upper portion 130 and lower portion 132 of card portion 110. Perforation 134 facilitates the separation of card components 130 and 132 when identification assembly 100 is paired with the appropriate library book. Perforation 134 is preferably a letter trim micro perforation, or as close thereto as possible. A micro perforation produces a cleaner edge when borrower's card 130 is removed from lower portion 132.

FIG. 5 shows the attachment of card portion 110 to label portion 108. Side 136 of card portion 110 is attached to side 138 of label portion 108 by gluing the back side of liner 120 to the front of card portion 110. Any suitable permanent glue can be used. The easy and clean removal of card portion 110 from label portion 108 of identification assembly 100 is provided by vertical perforation 140 as shown in FIGS. 4 and 5. Perforation 140 is positioned to be coincident with side 138 of liner 120 so that when card portion 110 is removed from label portion 108, borrower's card 130 does not have any remnants of glue, but instead has a clean edge. Again, in the preferred embodiment, perforation 140 is a letter trim micro perforation which helps to produce a clean edge when card 130 is removed from label portion 108.

Turning again to FIG. 4, it can be seen that card holder assembly 112 is printed on its top surface with form 142 which can be used to record due date information regarding the book to which card holder assembly 112 is eventually attached. Borrower's card 130 of card portion 110 is imprinted with form 144. Form 144 can be used to track the borrowing activity of the library book in question. Finally, as can be seen in FIG. 5, the back side of borrower's card 130 is printed with form 146. Form 146 is formatted to record the same sort of borrowing activity that form 144 records.

The preferred embodiment shown in FIG. 4 has label portion 108 and card portion 110 attached to one another. It is contemplated, however, that the identification system of the present invention could just include label portion 108 with the borrower's card being provided separately.

The advantages of identification assembly 100 are numerous. Perhaps the most important advantage arises from the ability to print all of the identifying components for any given library book in one operation. As alluded to earlier, identification assembly 100 is thin enough and flexible enough to be easily fed through a laser printer. Alternatively, an impact printer or typewriter can easily be used as well. A printer is used to imprint each of the components of identification assembly 100 with information specific to the library book to which the components are to be attached.

For instance, card holder assembly 112 may be imprinted with the name of the library book, the Dewey decimal number of the book, another number unique to that book, and maybe the library or organization name, to name a few possibilities. Identification labels 114*a–b* may be imprinted with a bar code so that the information about the book can be easily scanned by a bar code reader. Identification labels 114*a–b* can also be imprinted with information similar to that described for card holder assembly 112. Spine labels 116*a–b* can be imprinted with the Dewey decimal number of the book and any other identifying information that is appropriate. Finally, borrower's card 130 can be imprinted with the name of the library book, the Dewey decimal number, and a unique identifying number, to name a few possibilities.

To facilitate the printing of the identification information on all of the components on identification assembly 100, software (not shown) can be provided to help the user print the appropriate information at the appropriate location on identification assembly 100.

Turning now to FIG. 6, book 150 is shown with some of the components of identification assembly 100 attached. More specifically, card holder assembly 112 has been applied to the back inside cover of the book by removing liner 120 and exposing the adhesive on the back of label material 118 of card holder assembly 112. Borrower's card 130 has been placed in pocket 154 of card holder assembly 112. Identification label 114*a* has been placed on back cover 156 of book 150 and spine label 116*a* has been placed on spine 158 of book 150.

Figure 7:
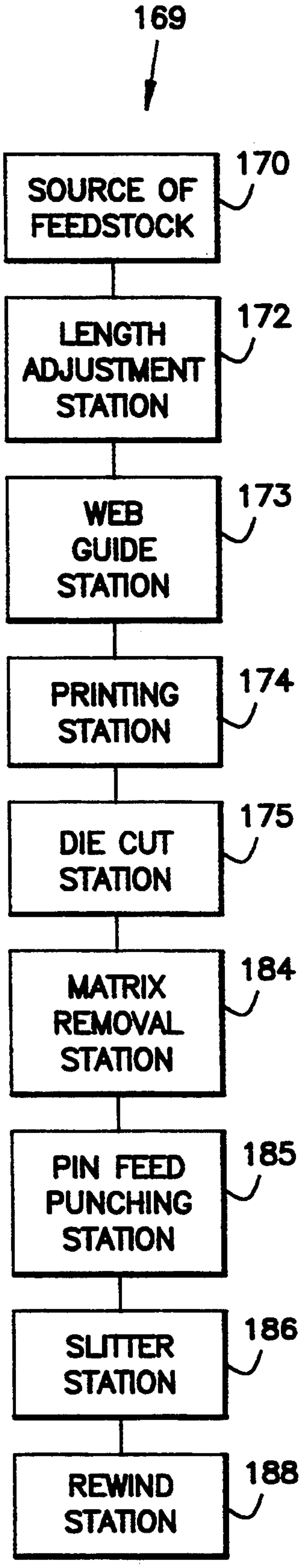
FIG. 7 is a block diagram illustrating the process of preparing label portion 108 of the library item identification system shown in FIG. 4.

FIGS. 7 and 8*a–d* help illustrate the process of making label portion 108 of identification assembly 100. FIG. 7 is a block diagram of the process that take place in making label portion 108 using flexographic press 169. The flexographic press is well known in the art as are its operating characteristics. Therefore, the operation of press 169 to create the components of the present invention will be described with reference to block diagrams.

Figure 8A:
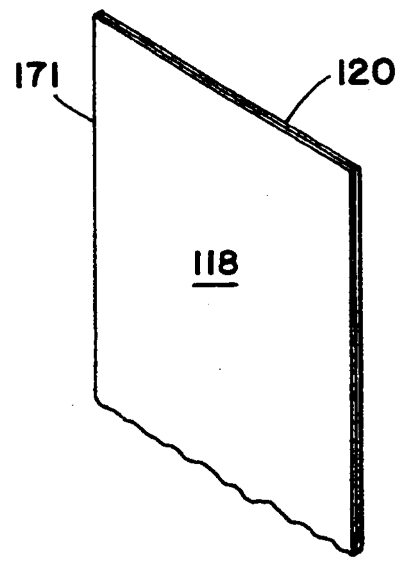

Block 170 shows the source of feedstock 171. As described above, feedstock 171 in the preferred embodiment is the synthetic label material 118 with its backside coated with pressure sensitive adhesive which in turn is covered with a liner 120. Feedstock 171 in FIG. 7 is fed into the flexographic press 169 in roll form. FIG. 8*a* illustrates feedstock 171 as it enters press 169.

Length adjustment station 172 stretches feedstock 171 to be a predetermined length. Heat, moisture and other environmental and press-related factors cause the length of materials to vary so it is important to adjust the length of feedstock 171 to make it uniform. This is especially important if feedstock 171 is to be collated later with another material. Adjusting the length will ensure proper registration and alignment of components in that later process. Web guide station 173 ensures that feedstock 171 will remain in proper edge alignment as feedstock 171 moves through press 169.

Printing station 174 handles two printing steps in the formation of label portion 108. First, a portion of feedstock 171 being fed through printing station 174 is printed with beige ink. This portion of feedstock 171 corresponds to that portion of the label material 118 which will eventually form card holder assembly 112. This provides the traditional manila color for the card holder. The beige ink used in the process shown in FIG. 7 is designed to adhere well to label material 118 without inhibiting toner adhesion when card holder assembly 112 is printed with a laser printer. The beige ink is printed at printing station 174 by using a printing plate in a manner well known in the art.

Figure 8B:
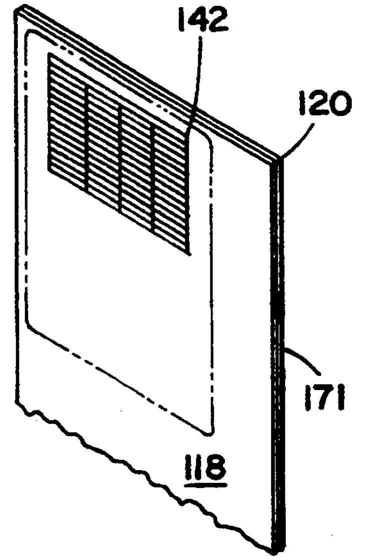

Printing station 174 also prints form 142 on that portion of label material 118 of feedstock 171 which will form the top portion of card holder assembly 112. In the preferred embodiment, form 142 is printed with blue ink. FIG. 8*b* illustrates feedstock 171 after it has exited printing station 174 and shows form 142. The beige tint is not shown.

Figure 8C:
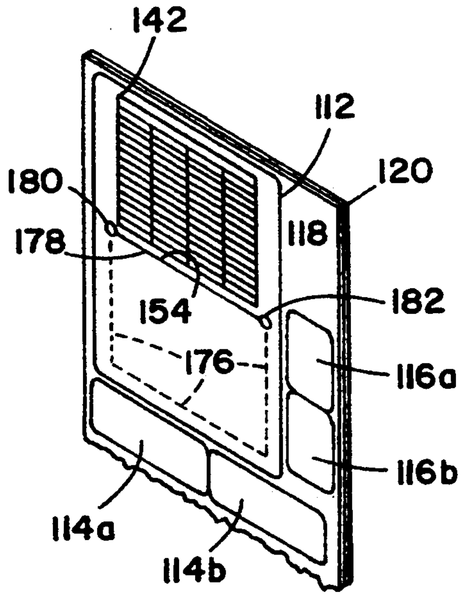

Die cut station 175 in FIG. 7 provides the cuts in label material 118 and liner 120 of the feedstock 171 which form components 112, 114*a–b*, and 116*a–b*. Several cutting steps take place at die cut station 175. Label material 118 is cut to form the outside edges of card holder assembly 112, identification labels 114*a–b*, and spine labels 116*a* and 116*b*. FIG. 8*c* shows feedstock 171 after these cuts in label material 118 have been made. Die cut station 175 also makes cuts 176 in liner 120 to form pocket 154 of card holder assembly 112. Cuts 176 are shown in dotted lines in FIG. 8*c*. Finally, the top edge of pocket 154 is formed at die cut station 175 by cut 178 through both label material 118 and liner 120. As explained fully above, cut 178 is terminated by circle cuts 180 and 182 through at least label material 118 of feedstock 171. In the preferred embodiment, circle cuts 180 and 182 are also cut through liner 120.

Figure 8D:
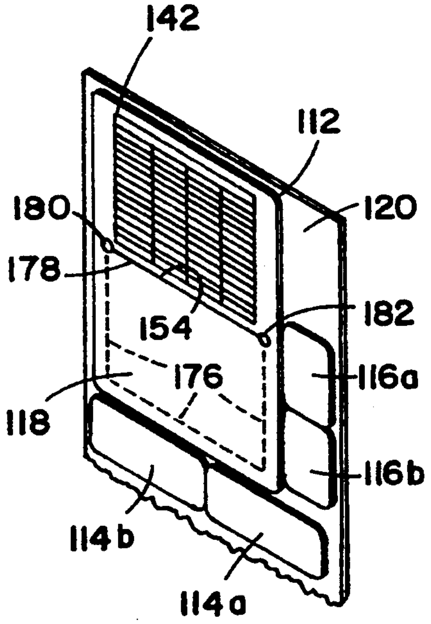

Matrix removal station 184 is optional, but provided in the preferred embodiment. Matrix removal station 184 removes that portion of label material 118 which does not form card holder assembly 112, identification labels 114*a–b*, or spine labels 116*a–b*. The result of this step at matrix removal station 184 is shown in FIG. 8*d*. As can be seen, FIG. 8*d* corresponds to label portion 108 as shown in FIG. 4. As an alternative, the portion of label material 118 not forming the components of label portion 108 can be left on feedstock 171 as this facilitates feeding through some printers.

Pin feed punching station 185 punches pin feed holes on the side edges of feedstock 171 in the preferred embodiment. These holes allow feedstock 171 to be pin-fed through additional processing. The holes also allow processed feedstock 171 to be fed as a continuous form through a laser printer when identifying information is printed on label portion 108. If feedstock 171 is not going to be processed further, i.e., attached to paper tagstock forming card portion 110, and is going to be sheeted (separated into the 2-up format shown in FIG. 4), there is no need for pin feed holes and station 185 does not operate in this case.

Slitter station 186 can makes perforation 106 as shown in FIG. 4 if label portion 108 is going to be used without further processing. Similarly slitter station 186 can make additional perforations (not shown( on the top and bottom of label portion 108 as shown in FIG. 4 so that feedstock 171 can be folded along these top and bottom perforations for continuous form applications. Generally, these steps at station 186 will only take place if feedstock 171 will not be further processed.

Finally, as shown in FIG. 7, processed feedstock 171 is rewound back on a roll at rewind station 188 in the preferred embodiment.

Card portion 110 of identification assembly 100 is added during a process separate from that shown in FIG. 7 in the preferred embodiment. This additional processing step is illustratively shown in the block diagram of FIG. 9. FIG. 9 illustrates the process that takes place in flexographic press 199 to create card portion 110. Again, as with FIG. 7, flexographic press 199 is well known in the art as are its operating characteristics. Therefore, the operation of press 199 to create card portion 110 of the present invention will be described with reference to block diagrams.

Block 200 shows the source of tagstock 201. As described above, tagstock 201 in the preferred embodiment is 125# white library tag which meets trade specifications for borrower's cards. Tagstock 201 in FIG. 9 is fed into flexographic press 199 in roll form.

Length adjustment station 202 and web guide station 204 adjust and align, respectively, tagstock 201 in the same manner and for the same reasons that stations 172 and 173, respectively, are used in connection with feedstock 171 in FIG. 7.

Printing station 206 prints forms 144 and 146 on that portion of tagstock 201 which will form borrower's card 130. In the preferred embodiment, forms 144 and 146 are printed with blue ink.

Die cut station 208 is provided for making perforation 134, as shown in FIG. 4. Alternatively, perforation 134 can be made by cross-perf station 214. Pin feed punching station 210 punches pin feed holes on the side edges of tagstock 201. These holes allow tagstock 201 to be pin-fed through additional processing steps. The holes also allow for the possibility that processed tagstock 201 can be fed as a continuous form through a laser printer when identifying information is printed on borrower's card 130. If tagstock 201 is not going to be processed further or is to be used in sheeted form, there is no need for pin feed holes and station 210 does not operate in that case.

Slitter station 212 provides perforation 140, as shown in FIG. 4, on tagstock 201. Rewind station 216 rewinds processed tagstock 201 back on a roll in the preferred embodiment.

FIG. 10 illustrates the process of attaching processed or converted feedstock 171 to processed or converted tagstock 201 to form assembly 100 as shown in FIG. 4. FIG. 10 is a block diagram of collator 217 whose operation is well known in the art. Block 218 shows the source of converted feedstock and in the preferred embodiment this will be processed feedstock 171 from FIG. 7. Block 220 shows the source of converted tagstock and in the preferred embodiment this will be processed tagstock from FIG. 9. As explained above, feedstock 171 and tagstock 201 were provided with pin feed holes during their respective processing in steps shown in FIGS. 7 and 9. These holes allow converted feedstock 171 and converted tagstock 201 to be pin-fed through collator 217 so that they are keep in register.

At glueing station 222, converted feedstock 171 and converted tagstock 201 are attached by way of an adhesive that fastens the materials together as described above with reference to FIGS. 4 and 5. This forms combined stock 223. Trimming station 224 perforates the combined stock 223 to form perforation 106, as shown in FIG. 4. Trimming station 224 also trims off the pin feed holes on the side edges of combined stock 223 in the preferred embodiment. These pin feed holes can be retained if assembly 100 is going to be used in continuous form applications. Trimming station 224 can also provide horizonal perforations on combined stock 223 which correspond to the top and bottom edges of assembly 100 shown in FIG. 4. These perforations allow combined stock 223 to be used in continuous form applications.

At sheeting or folding station 226, combined stock 223 is sheeted in the preferred embodiment to form assembly 100 as shown in FIG. 4. This is done by cutting combined stock 223 to form the top and bottom edges of assembly 100. Alternatively, station 226 folds combined stock 223 along the horizontal perforations mentioned above if it is to be used as a continuous form.

At packaging station 228, combined stock 223 is shrink-wrapped and packaged in quantities that can be set and varied by the user of collator 217.

While in the preferred embodiment, label portion 108 and card portion 110 are prepared separately and then attached. It is contemplated that label portion 108 and card portion 110 can be prepared and attached to one another all in one process. This process is shown in FIG. 11 which is a block diagram illustrating flexographic press 229. Again, press 229 and its operation are well known in the art so the process will be explained using block diagrams.

Blocks 230 and 232 show the source of feedstock 231 and tagstock 233, respectively. In the preferred embodiment, feedstock 231 and tagstock 233 have the same characteristics of feedstock 171 and tagstock 201, respectively, described above. Both feedstock 231 and tagstock 233 are fed into press 229 in roll form. Web guide stations 234 and 236 ensure that feedstock 231 and tagstock 233, respectively, remain in proper edge alignment as they move through press 229.

Glueing station 238 operates to attach feedstock 231 and tagstock 233 to form combined stock 239 in the same manner described with respect to the attachment of feedstock 171 and tagstock 201 in FIG. 10.

Printing station 240 handles a variety of printing steps. A portion of combined stock 239 is printed with beige ink. This portion of combined stock 239 corresponds to that portion of label material 118 which will eventually form card holder assembly 112 as shown in FIG. 4. This provides the traditional manila color for the card holder. The beige ink used in printing station 240 is the same as that described in connection with the process shown in FIG. 7. The beige ink is printed at printing station 240 by using a printing plate in a manner well known in the art. Printing station 240 also prints forms 142, 144, and 146 on combined stock 239. In the preferred embodiment, forms 142, 144, and 146 are printed with blue ink.

Die cut station 242 also handles several steps. The feedstock 231 portion of combined stock 239 is die cut in the same manner as feedstock 171 was cut with respect to the process shown in FIG. 7. These cuts are made to form pocket 154 of card holder assembly 112. Die cut station 242 may also be used to create perforations 106 and 134 as shown in FIG. 4.

Matrix removal station 244 is optional, but provided in the preferred embodiment. The operation of matrix removal station 244 is the same as that described for matrix removal station 184 with respect to the process shown in FIG. 7.

Pin feed punching station 246 is provided to punch pin feed holes on the side edges of combined stock 239 which forms assembly 100, if it is to be fed as a continuous form through a laser printer which prints identifying information on label portion 108 and card portion 110. In the preferred embodiment, pin feed holes are not provided and therefore station 246 does not operate.

Slitter station 248 provides perforation 140 on combined stock 239 and also trims combined stock 239 to the correct size. Slitter station 248 can also provide perforations corresponding to the top and bottom of assembly 100 shown in FIG. 4 so that assembly 100 can be folded along these top and bottom perforations for continuous form applications.

Sheeting or folding station 250 sheets combined stock 239 in the preferred embodiment to form assembly 100 as shown in FIG. 4. This is done by cutting combined stock 239 to form the top and bottom edges of assembly 100. Alternatively, as discussed above, assembly 100 can be used as a continuous form. In this case, station 250 folds combined stock 239 along the horizontal perforations at the top and bottom of assembly 100 mentioned above.

Packaging station 252 shrink-wraps and packages combined stock 239, which again, in the preferred embodiment is assembly 100, into quantities that can be set and varied by the user of press 229.

It is to be understood that even though numerous characteristics and advantages in the present invention have been set forth in the preceding description, together with details of the structure and function of the invention, this disclosure is illustrative only, and changes may be made in detail, especially in matters of shape, size, and arrangement of components within the principles of the invention to the full extent indicated by the broad general meaning of the terms in which the appended claims are expressed.

What is claimed is:

1. A device for forming a borrower's card holder in an item available for temporary loan from a central location of items, said device comprising:

(a) a sheet of liner material having a liner longitudinal dimension;

(b) a plurality of card holders comprising:

(i) individual sheets of card holder material each having a printable front surface and an opposite rear surface;

(ii) a pressure sensitive adhesive on said rear surface, said adhesive and said liner material selected for said adhesive to be releasably adherent to said liner material;

(iii) a top edge and a bottom edge separated by a card holder longitudinal dimension, a first side edge and a second side edge extending between said top and bottom edges;

(c) each of said sheets of card holder material releasably secured to said sheet of liner material with said sheets disposed in flat overlying relation thereto and with only said rear surface of said sheets opposing said liner material and with said adhesive of each of said sheets releasably adhered to said liner material;

(d) said sheets positioned on said liner material and spaced apart along said liner longitudinal dimension with said card holder longitudinal dimensions generally parallel to said liner longitudinal dimension;

(e) a through cut formed through each of said sheets of card holder material with said through cuts sized and positioned to extend through both said card holder material and said liner material, said through cut extending generally transverse to said card holder longitudinal dimension and extending only partially toward said first and second side edges with said through cuts dividing each of said sheets of card holder material into an upper area and a lower area; and (f) a partial cut formed through only said liner material and opposing each of said sheets of card holder material, said partial cut and said through cut cooperating to define a pocket area contained with said lower area and extending from said through cut only partially toward said bottom edge in a direction generally parallel to said longitudinal dimension and extending in a transverse direction only partially toward said first and second side edges, said partial cut and said through cut cooperating to define a removable area of said liner material covering said pocket area; and wherein the label material is synthetic.

2. A device forming a borrower's card holder in an item available for temporary loan from a central location of items, said device comprising:

(a) a sheet of liner material having a liner longitudinal dimension;

(b) a plurality of card holders comprising:

(i) individual sheets of card holder material each having a printable front surface and an opposite rear surface;

(ii) a pressure sensitive adhesive on said rear surface, said adhesive and said liner material selected for said adhesive to be releasably adherent to said liner material;

(iii) a top edge and a bottom edge separated by a card holder longitudinal dimension, a first side edge and a second side edge extending between said top and bottom edges;

(c) each of said sheets of card holder material releasably secured to said sheet of liner material with said sheets disposed in flat overlying relation thereto and with only said rear surface of said sheets opposing said liner material and with said adhesive of each of said sheets releasably adhered to said liner material;

(d) said sheets positioned on said liner material and spaced apart along said liner longitudinal dimension with said card holder longitudinal dimensions generally parallel to said liner longitudinal dimension;

(e) a through cut formed through each of said sheets of card holder material with said through cuts sized and positioned to extend through both said card holder material and said liner material, said through cut extending generally transverse to said card holder longitudinal dimension and extending only partially toward said first and second side edges with said through cuts dividing each of said sheets of card holder material into an upper area and a lower area; and (f) a partial cut formed through only said liner material and opposing each of said sheets of card holder material, said partial cut and said through cut cooperating to define a pocket area contained with said lower area and extending from said through cut only partially toward said bottom edge in a direction generally parallel to said longitudinal dimension and extending in a transverse direction only partially toward said first and second side edges, said partial cut and said through cut cooperating to define a removable area of said liner material covering said pocket area; and wherein the label and liner materials are of a thickness adapted to be fed through a laser printer.

3. A device forming a borrower's card holder in an item available for temporary loan from a central location of items, said device comprising:

(a) a sheet of liner material having a liner longitudinal dimension;

(b) a plurality of card holders comprising:

(i) individual sheets of card holder material each having a printable front surface and an opposite rear surface;

(ii) a pressure sensitive adhesive on said rear surface, said adhesive and said liner material selected for said adhesive to be releasably adherent to said liner material;

(iii) a top edge and a bottom edge separated by a card holder longitudinal dimension, a first side edge and a second side edge extending between said top and bottom edges;

(c) each of said sheets of card holder material releasably secured to said sheet of liner material with said sheets disposed in flat overlying relation thereto and with only said rear surface of said sheets opposing said liner material and with said adhesive of each of said sheets releasably adhered to said liner material;

(d) said sheets positioned on said liner material and spaced apart along said liner longitudinal dimension with said card holder longitudinal dimensions generally parallel to said liner longitudinal dimension;

(e) a through cut formed through each of said sheets of card holder material with said through cuts sized and positioned to extend through both said card holder material and said liner material, said through cut extending generally transverse to said card holder longitudinal dimension and extending only partially toward said first and second side edges with said through cuts dividing each of said sheets of card holder material into an upper area and a lower area; and (f) a partial cut formed through only said liner material and opposing each of said sheets of card holder material, said partial cut and said through cut cooperating to define a pocket area contained with said lower area and extending from said through cut only partially toward said bottom edge in a direction generally parallel to said longitudinal dimension and extending in a transverse direction only partially toward said first and second side edges, said partial cut and said through cut cooperating to define a removable area of said liner material covering said pocket area; and wherein the surface of the releasable liner material not in contact with the adhesive is textured.

4. A device for forming a borrower's card holder in an item available for temporary loan from a central location of items, said device comprising:

(a) a sheet of liner material having a liner longitudinal dimension;

(b) a plurality of card holders comprising:

(i) individual sheets of card holder material each having a printable front surface and an opposite rear surface;

(ii) a pressure sensitive adhesive on said rear surface, said adhesive and said liner material selected for said adhesive to be releasably adherent to said liner material;

(iii) a top edge and a bottom edge separated by a card holder longitudinal dimension, a first side edge and a second side edge extending between said top and bottom edges;

(c) each of said sheets of card holder material releasably secured to said sheet of liner material with said sheets disposed in flat overlying relation thereto and with only said rear surface of said sheets opposing said liner material and with said adhesive of each of said sheets releasably adhered to said liner material;

(d) said sheets positioned on said liner material and spaced apart along said liner longitudinal dimension with said card holder longitudinal dimensions generally parallel to said liner longitudinal dimension;

(e) a through cut formed through each of said sheets of card holder material with said through cuts sized and positioned to extend through both said card holder material and said liner material, said through cut extending generally transverse to said card holder longitudinal dimension and extending only partially toward said first and second side edges with said through cuts dividing each of said sheets of card holder material into an upper area and a lower area; and (f) a partial cut formed through only said liner material and opposing each of said sheets of card holder material, said partial cut and said through cut cooperating to define a pocket area contained with said lower area and extending from said through cut only partially toward said bottom edge in a direction generally parallel to said longitudinal dimension and extending in a transverse direction only partially toward said first and second side edges, said partial cut and said through cut cooperating to define a removable area of said liner material covering said pocket area; and wherein the through cut is terminated at each of its ends in a circle cut in the sheets of card holder material.

5. A device for forming a borrower's card holder in an item available for temporary loan from a central location of items, said device comprising:

(a) a sheet of liner material having a liner longitudinal dimension;

(b) a plurality of card holders comprising:

(i) individual sheets of card holder material each having a printable front surface and an opposite rear surface;

(ii) a pressure sensitive adhesive on said rear surface, said adhesive and said liner material selected for said adhesive to be releasably adherent to said liner material;

(iii) a top edge and a bottom edge separated by a card holder longitudinal dimension, a first side edge and a second side edge extending between said top and bottom edges;

(c) each of said sheets of card holder material releasably secured to said sheet of liner material with said sheets disposed in flat overlying relation thereto and with only said rear surface of said sheets opposing said liner material and with said adhesive of each of said sheets releasably adhered to said liner material;

(d) said sheets positioned on said liner material and spaced apart along said liner longitudinal dimension with said card holder longitudinal dimensions generally parallel to said liner longitudinal dimension;

(e) a through cut formed through each of said sheets of card holder material with said through cuts sized and positioned to extend through both said card holder material and said liner material, said through cut extending generally transverse to said card holder longitudinal dimension and extending only partially toward said first and second side edges with said through cuts dividing each of said sheets of card holder material into an upper area and a lower area; and (f) a partial cut formed through only said liner material and opposing each of said sheets of card holder material, said partial cut and said through cut cooperating to define a pocket area contained with said lower area and extending from said through cut only partially toward said bottom edge in a direction generally parallel to said longitudinal dimension and extending in a transverse direction only partially toward said first and second side edges, said partial cut and said through cut cooperating to define a removable area of said liner material covering said pocket area; and a plurality of secondary labels disposed in a predetermined pattern adjacent to each of said sheets of card holder with each of said secondary labels releasably adhered to the said liner material and with said secondary labels disposed in identical patterns adjacent each of said plurality of sheets of card holder material.

6. A device according to claim 4 wherein the liner material is also cut in circle patterns to coincide with the circle cuts in the sheets of card holder.

7. A device according to claim 5 wherein said plurality of secondary labels includes at least a first and second secondary label, said first and second secondary labels being of different sizes.

8. A device according to claim 7 wherein the first label is sized to be placed on the spine of a library book and the second label is sized to be printed with an identifying bar code and placed on the back or inside cover of the library book.

9. An integrated system according to claim 5 wherein said plurality of secondary labels include a multiplicity of said secondary labels being positioned both below and to one side of the card holder.

10. A device according to claim 5 wherein the sheets of card holder material, the liner material and the secondary labels are of a thickness adapted to be fed through a lasert printer.

11. A device according to claim 5 further comprising software means for controlling the printing of item identifying information in the appropriate locations on the sheets of material and the secondary label.

12. An integrated identification system for an item available for temporary loan from a central location of items, comprising:

a sheet of card holder material having a printable front surface and having pressure sensitive adhesive on its back surface, the label material being cut in such a pattern as to form a holder for a borrower's card, said sheet of card holder having a longitudinal dimension extending from an upper edge to a lower edge;

a flat sheet of releasable liner material covering the adhesive on the sheet of card holder material, the liner material being appropriately cut to cooperate with the card holder material in forming the card holder when the liner is released from the card holder material, said sheet of liner material having a side edge;

said sheet of card holder material disposed in overlying relation on said liner material with said longitudinal dimension of said card holder material generally parallel to said side edge and with said adhesive releasably adhered to said liner material;

a sheet of paperstock suitable for acting as a borrower's card, at least one side of the paperstock being adapted to be printed with a form for recording borrowing information about the item, said sheet of paperstock having a side edge;

said side edge of said paperstock releasably secured to said side edge of said liner material with said liner material and said paperstock generally co-planar;

whereby the card holder and the borrower's card can be printed with identifying information about the item in one printing operation and remain together until the card holder is attached to the item and the borrower's card is placed within the holder.

13. An integrated system according to claim 12 wherein said liner material and said paperstock are disposed in overlapping relation to define an overlapping area and said liner material and said paperstock are adhered by an adhesive applied to said overlapping area, the paperstock is perforated immediately adjacent the overlapping area whereby the paperstock can be cleanly detached from the liner material.

14. An integrated system according to claim 13 wherein the paper stock is perforated with a letter trim micro perforation.

15. An integrated system according to claim 12 wherein the paperstock is library tag.

16. An integrated system according to claim 12 wherein the sheet of card holder material and the liner material, and the paperstock are all of a thickness adapted to be fed through a laser printer.

17. An integrated system according to claim 12 wherein the sheet of card holder material is further cut in such a way as to form at least one label in addition to the card holder.

18. An integrated system according to claim 12 further comprising software means for controlling the printing of library item identifying information in the appropriate locations on the card holder and the borrower's card.

* * * * *